March 12, 1968  A. L. LEWIS  3,373,179
METHOD FOR THE MANUFACTURE OF DIALKYL
ALUMINUM HYDRIDE COMPOUNDS
Filed Sept. 14, 1962
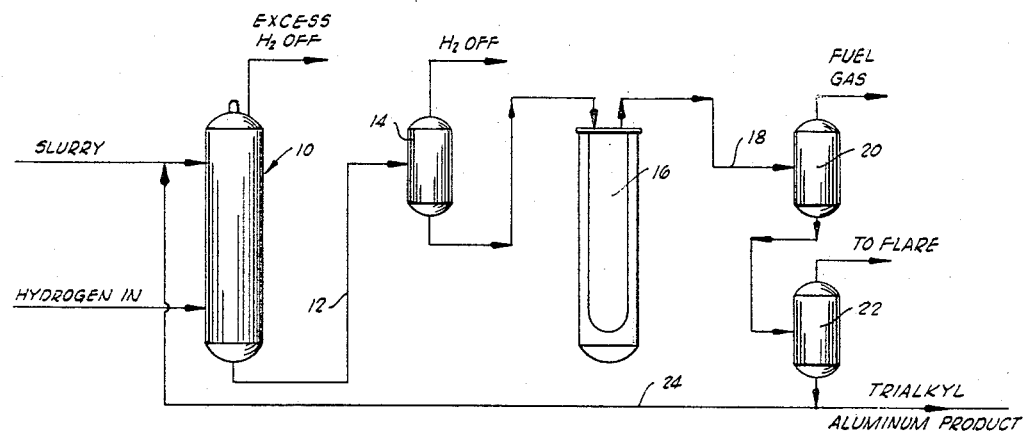
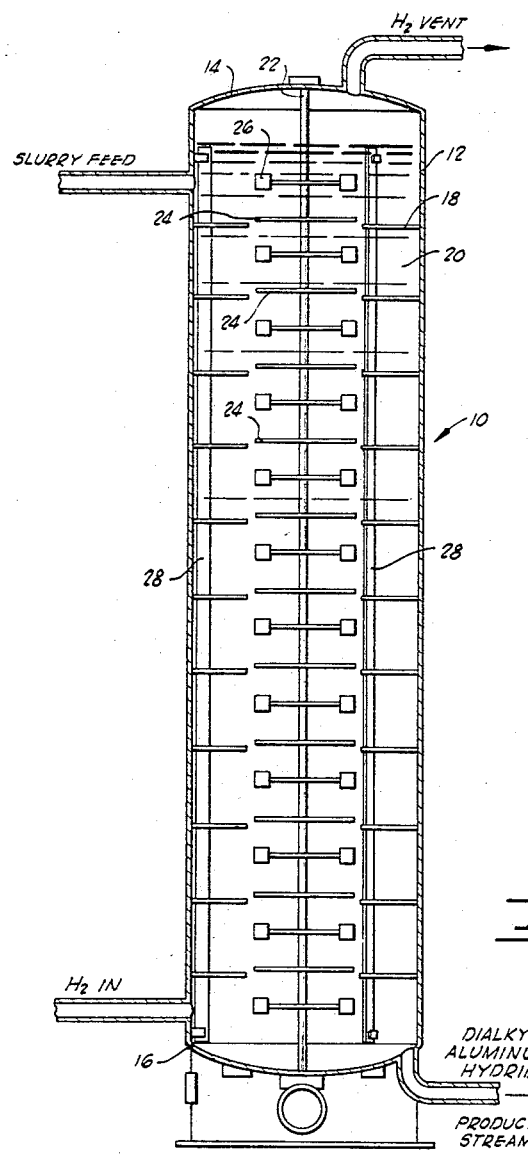
INVENTOR.
ALLEN L. LEWIS
BY
AGENT

United States Patent Office 3,373,179
Patented Mar. 12, 1968

3,373,179
METHOD FOR THE MANUFACTURE OF DIALKYL ALUMINUM HYDRIDE COMPOUNDS
Allen L. Lewis, Houston, Tex., assignor to Continental Oil Company, Ponca City, Okla., a corporation of Delaware
Filed Sept. 14, 1962, Ser. No. 223,755
4 Claims. (Cl. 260—448)

This invention relates to the preparation of trialkyl aluminum compounds, and more particularly to the preparation of the dialkyl aluminum hydride intermediate which is utilized in preparing such compounds. More specifically, but not by way of limitation, the present invention relates to improvements in the process and apparatus utilized to prepare dialkyl aluminum hydride, using aluminum, hydrogen and trialkyl aluminum as the reactants.

It is known that valuable trialkyl aluminum compounds can be manufactured directly from aluminum, hydrogen and an α-olefinic material, such as ethylene. This technique is described in U.S. Patent 2,787,626 to Redman, as well as in several United States and foreign patents issued to Karl Ziegler. The preparation of trialkyl aluminum compounds, also termed aluminum trialkyls, proceeds by the following reactions:

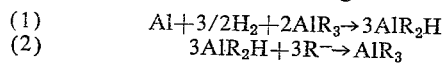

(1) $Al + 3/2 H_2 + 2AlR_3 \rightarrow 3AlR_2H$
(2) $3AlR_2H + 3R^- \rightarrow AlR_3$ where R is an alkyl radical and R⁻ is supplied by a suitable α-oelfinic material or mixture of α-olefinic materials. Instead of the alkyl substituents of the trialkyl aluminum reactants and product being identical, alkyl groups of differing structure may be bound to the aluminum.

From Reactions 1 and 2, it may be seen that a net yield of one mole of trialkyl aluminum for each two moles of trialkyl aluminum utilized in the first reaction is realized. Thus, once the reactions are initiated, a portion of the trialkyl aluminum product may be recycled to the situs of the initial reaction and used therein so that the only materials supplied and consumed in the reaction are aluminum, hydrogen and α-olefinic material, such as ethylene, which supplies the alkyl radical which reacts with the dialkyl aluminum hydride in the second reaction.

It is known that the two reactions set forth above may be carried out either in the same reaction vessel or in separate reaction vessels. It is also known that several advantages accrue when the reactions are conducted in separate reaction vessels, most notable of which is the improvement in yield of the trialkyl aluminum compound produced.

Heretofore, several proposals have been advanced for improving the rate of progression and efficiency of the initial reaction which yields the dialkyl aluminum hydride intermediate according to Equation 1 set forth above. One of the most recent of these proposals is that set forth in U.S. Patent 2,930,808, issued to Kurt Zosel on Mar. 29, 1960. In the Zosel process, it is proposed to contact finely divided aluminum metal with hydrogen gas and liquid trialkyl aluminum in a single reaction vessel which is constructed to contain a series of vertically spaced screening plates. The screening plates divide the reaction vessel into a series of vertically tiered reaction spaces and in this way relatively efficient contact between the liquid and gaseous material and the solid finely divided aluminum is obtained. Hydrogen gas is introduced to the bottom of the vertical reaction vessel containing vertically spaced screening plates after the reactor has been completely filled with a liquid trialkyl aluminum compound. The rate of circulation of the hydrogen gas through the reactor is such that a gas pocket or "buffer" is built up beneath each one of the screening plates in the reactor. The gas buffers beneath the screening plates prevent downward or retrograde flow of liquid and finely divided aluminum, but permit these materials to flow upward through the screening plates and the gas buffer zones. In this way, the aluminum is more efficiently consumed in the reaction and an improvement in reaction velocity is achieved.

Although the Zosel multi-stage reactor utilized for the more efficient carrying out of a reaction involving intimate contact between finely divided solids, liquid and gaseous materials does provide certain advantages over the utilization of a plurality of series-connected reactors which are continuously and successively traversed by the reactants, certain limitations necessarily apply to the conditions under which the Zosel reactor may be utilized so that its versatility is limited to the employment of specific rates of introduction to the reactor of the gaseous material and specific particle sizes of the finely divided aluminum metal which is introduced to the reactor.

These limitations of the Zosel reactor stem from its dependency in operation upon the development of the stable, relatively high pressure gas buffer zones in the reaction vessel. To form these zones requires the use of screening plates having pores of very small diameter therethrough (of the order of 1 mm.). This requirement limits the size of the aluminum particles which may be used and makes the screen more susceptible to clogging, which clogging in turn results in the temporary development of a larger hold-up of gas beneath the screen in the area where it has become clogged. The reactants then become unevenly distributed in the reaction zone adjacent the clogged screen, and such disproportionate mixing of the reactants results in a reduction in the reaction velocity and a lower conversion of the reactants to the dialkyl aluminum hydride product.

The present invention contemplates an improvement over the apparatus disclosed in the Zosel patent, and also contemplates improvements in certain procedural steps prescribed in the Zosel patent for the preparation of trialkyl aluminum compounds. Broadly, it is proposed by the present invention to provide an improved process for the preparation of dialkyl aluminum hydride by contacting hydrogen gas with a slurry of finely divided aluminum metal in a trialkyl aluminum compound in a multi-stage reaction zone. In one aspect the invention is directed to a multi-stage reaction vessel. The multi-stage reaction zone provides a more intimate contact and even distribution of the reactants and products throughout the plurality of stages provided in the reaction zone. The reaction zone also permits widely varying flow rates of hydrogen gas to be employed in carrying out the cited reaction with no limitation upon such flow rates being imposed by the necessity to develop stable gas buffer zones at spaced intervals throughout the reaction zone. Additionally, the reaction zone does not substantially limit the particle size of the finely divided metal which constitutes one of the reactants utilized therein so that various methods of preparation of the subdivided metal may be employed, and improved yields of the dialkyl aluminum hydride product may be realized by varying the reaction conditions as may be necessary or desirable. The ability to use aluminum particles of larger size in the method and apparatus of the present invention constitutes a very important advantage of the invention, since larger particles such as aluminum chips (as opposed to fine powder or granules) are much less expensive than smaller particles.

By way of a more specific summation of the structural features of the improved multi-stage reaction zone which is utilized for preparing dialkyl aluminum hydride by the process of the present invention, such multi-stage reaction zone may be described as a vertically extending, generally cylindrical reaction zone having located therein, a plurality of vertically spaced, annular or doughnut-shaped baffle plates. These baffle plates each have a large circular aperture through the center thereof, which apertures are partially closed by a plurality of circular plates concentrically affixed to a rotatable shaft which extends from the top to the bottom of the reaction zone and is coaxially positioned therein. In other words, the circular plates secured to the rotatable shaft cooperate with the annular baffles spaced vertically from each other throughout the length of the reaction zone to define annular openings between the adjacent edges thereof through which reactant materials pass in traversing the length of the reaction zone. These openings are of a size and location such that relatively large particles of subdivided metal may pass therethrough, and yet the annular baffles and circular plates effectively partition the cylindrical reaction zone into a series of adjacent, vertically tiered reaction spaces or stages, each of which contains evenly distributed reactant and product materials in a particular stage of conversion.

Positioned between each of the vertically spaced circular plates which are secured to the rotatable shaft passing through the reaction zone, and located within each of the reaction stages defined by the circular plates and annular baffles, are a plurality of paddle members or turbine blades which function to thoroughly agitate the reaction mixture in each of the stages, thereby assuring a certain degree of homogeneity in the mixture and a thorough and even distribution of reactants and products therein. The paddle blades which extend radially from the central shaft also function to suspend by agitation the solid metal particles which are located within the respective reaction stages.

In addition to improvements in the general method proposed by Zosel for conducting the dialkyl aluminum hydride reaction, the present invention also contemplates other improvements in the procedure or method suggested by Zosel. For example, it is proposed to employ a considerable excess of sub-divided aluminum metal in the dialkyl aluminum hydride reaction so that unreacted aluminum metal is discharged from the reaction zone to a subsequent ethylation reaction zone along with the dialkyl aluminum hydride product. In a preferred embodiment of the invention, relatively inexpensive particles of metallic aluminum having a particle size as large as ⅛ inch are employed. In the ethylation reaction zone, the surplus unreacted subdivided aluminum metal and the dialkyl aluminum hydride are contacted with a suitable α-olefinic material to produce trialkyl aluminum compounds. A portion of the trialkyl aluminum product from the ethylation reaction zone is then recycled to the initial multi-stage reaction zone along with all or a portion of the surplus unreacted aluminum carried in such product stream. In this way, the excess unreacted aluminum metal which is recycled to the multi-stage hydrogenation reaction zone is highly activated and enables a considerable reduction in the required period of residence of the reactants in the multi-stage reaction zone.

From the foregoing description of the invention, it will have become apparent that the major object of the present invention is to improve the efficiency and versatility of conditions with which a reaction involving the contact of a gaseous material with finely divided solid material and a liquid can be carried out in a single, multi-stage reaction zone.

More specifically, it is an object of the present invention to improve the efficiency with which dialkyl aluminum hydride can be produced by contact of finely divided aluminum metal with hydrogen gas and a trialkyl aluminum compound in a single, multi-stage reaction zone.

Another object of the invention is to permit dialkyl aluminum hydride to be more economically manufactured by contacting a trialkyl aluminum, metallic aluminum and hydrogen in a single, multi-stage reaction zone, such economic improvement being obtainable by reason of the use of aluminum having a larger average particle size than the types of subdivided aluminum heretofore utilized.

It is a further object of the present invention to reduce the residence time of the reactants in the first reaction zone which is required to initiate the reaction between hydrogen gas and a slurry of aluminum metal in a liquid trialkyl aluminum compound when contact of the reactants is effected in a single, multi-stage reaction zone.

Another object of the present invention is to provide an improved multi-stage reaction vessel for preparing dialkyl aluminum hydride, the use of which vessel permits most of the advantages obtainable by the employment of a plurality of series-connected, individual reactors to be realized while decreasing the cost of the process when conducted using such serially-connected reactors and reducing the space or reaction volume requirements.

Yet another object of the invention is to provide improvements in the process of producing trialkyl aluminum compounds utilizing hydrogen gas, trialkyl aluminum, finely divided aluminum metal, and an α-olefinic material as the reactants.

In addition to the foregoing objects and advantages, additional advantages of the invention will become apparent as the following detailed description thereof is read in conjunction with a perusal of the accompanying drawings which illustrate my invention.

In the drawings:

FIGURE 1 is a schematic flow diagram illustrating schematically the method of the present invention and showing the flow of reactants, intermediates and products in the reaction system.

FIGURE 2 is a view in vertical section taken through the center of one embodiment of the novel multi-stage reaction vessel utilized in the system of the present invention for producing dialkyl aluminum hydride.

Referring now to the drawings in detail, and particularly to FIGURE 1, reference character 10 designates a multi-stage reaction zone. To the reaction zone 10 are charged the reactants comprising finely divided metallic aluminum, gaseous hydrogen and a trialkyl aluminum compound. In a preferred mode of operation, the finely divided metallic aluminum and the trialkyl aluminum compound will be simultaneously introduced to the top of the zone as a slurry. The trialkyl aluminum compound is preferably a liquid material, but in the event that it is not, it may be dissolved in a suitable inert hydrocarbon solvent, such as kerosene, toluene, benzene, hexane, octane, xylene, etc. The use of such inert solvent is preferred even when the trialkyl aluminum compound is a liquid material since the trialkyl aluminum materials are highly pyrophoric and the use of an inert solvent to dilute this reactant and thereby improve the safety with which it may be handled is desirable.

The finely divided aluminum metal can be prepared in a number of ways and is slurried into the trialkyl aluminum solution prior to its introduction to the reaction zone 10. The finely divided aluminum metal introduced to the multi-stage reaction zone 10 in the slurry can have a particle size in which the average diameter can be as small as 3 microns or as large as 0.125 inch. The subdivided aluminum can be prepared by a chipping procedure, since this type of comminution generally can be practiced much more economically than reduction of the aluminum to powder or granules. Typically, the aluminum particles have a particle size in which the average diameter can be in the range of from about 0.001 inch to about 0.125 inch. In a specific embodiment chips have been prepared having a rectangular or sliver-like configuration with dimensions of about 0.0025 inch in thickness, from about 0.187 inch to 0.25 inch in length, and from about 0.0625 inch to about 0.125 inch in width.

A small amount of zirconium or titanium metal is intentionally added to the aluminum metal, since such metals act as activators and promote the reaction of the aluminum with the other reactants in the multi-stage reaction vessel 10. The manner of addition of the activator metal and the benefits derived from its addition are described in application for United States Letters Patent Ser. No. 58,222, filed Sept. 26, 1960, now U. S. Patent No. 3,104,252, and assigned to the assignee of the present invention.

While both FIGURES 1 and 2 have shown the introduction of the hydrogen gas at the bottom of the reaction zone, it is within the scope of my invention to employ multi-stage injection, whereby hydrogen is introduced simultaneously into each of the reaction stages.

The alkyl groups of the trialkyl aluminum compound charged to the first reaction zone preferably contain from 2 to 20 carbon atoms and, as previously indicated, may be identical or different. Examples of trialkyl aluminum compounds which may be utilized in Reaction 1 are triethyl aluminum, tripropyl aluminum, tributyl aluminum, triisobutyl aluminum, tripentyl aluminum, trihexyl aluminum, tri-3-methyloctyl aluminum, trinonyl aluminum, tri-4-methyl-3-ethyl-decylaluminum, tridodecylaluminum, tripentadecylaluminum, tri-6-butyltetradecyl aluminum, trioctadecylaluminum, diethylpropyl aluminum, hexylheptyldodecyl aluminum, dioctylnonyl aluminum, 3-methylheptyloctyldecyl aluminum, 5-methyl-3-ethyldecyldodecyltetradecyl aluminum and diisobutylpentadecyl aluminum. In the event the trialkyl aluminum compound yielded by Reaction 2 corresponds to that which is to be charged to the reaction zone 10 for carrying out Reaction 1, a portion of the product of Reaction 2 may be utilized in making up the slurry charge to the reaction vessel. Where it is merely desired to produce mixed trialkyl aluminum compounds, such recycling may be practiced regardless of the α-olefins utilized in Reaction 2 or the types of trialkyl aluminum compounds produced.

The aluminum metal is preferably present in the slurry stream entering the multi-stage reaction zone stream in a stoichiometric excess over that which is required to complete the reaction according to Reaction 1 hereinbefore set forth. The use of such stoichiometric excess permits the unreacted excess aluminum which is discharged from the multi-stage reaction zone 10 with the dialkyl aluminum hydride product to be highly activated by passage through the reaction zone. Such highly activated excess aluminum may then subsequently be recovered from the product stream and recycled to the multi-stage reaction zone 10 where it is effective, by virtue of its high state of activation, to substantially reduce the residence time required for the reactants in the multi-stage reaction zone.

It should be understood, nevertheless, that though the employment of a stoichiometric excess of aluminum in the slurry fed to the multi-stage reaction zone 10 is preferred for the reasons enumerated, the process is operative using amounts of aluminum varying from less than the stoichiometric quantity to substantially in excess thereof. When operating with a stoichiometric excess of aluminum, it is preferred to use an amount of the metal exceeding by from about 10 to about 400 percent the stoichiometric quantity required by Reaction 1.

The residence time of the reactants in the reaction zone 10 may vary from about 5 minutes to about 5 hours, depending upon the degree of conversion desired. The state of activation of the aluminum and the hydrogen pressure employed will determine the degree of conversion which can be obtained using a given space velocity or residence time and operating at a given temperature.

Hydrogen is introduced to the bottom of the reaction zone 10 in sufficient quantity to maintain a hydrogen partial pressure in the vessel in the range of about 200 p.s.i.g. to about 5000 p.s.i.g., and preferably between about 500 p.s.i.g. and 2500 p.s.i.g. The temperature in the reaction zone 10 is maintained in the range of from 200° F. to 350° F. with a range of about 230° F. to about 290° F. being preferred. The hydrogen gas preferably is continuously introduced into the bottom of the zone in sufficient quantity to saturate the liquid solution and to provide the necessary hydrogen for the reaction. High reaction temperatures should be avoided as they cause an increase in the formation of dialkyl aluminum hydride by the following undesirable side reaction:

$$AlR_3 + H_2 \rightarrow RH + AlR_2H$$

Hydrogen to trialkyl aluminum mole ratios of from 0.45:1 to 5:1 can be utilized.

The effluent from the multi-stage reaction zone 10 is discharged at the bottom of the vessel through a conduit 12 and will contain dialkyl aluminum hydride and some trialkyl aluminum, the inert solvent utilized, and the excess unreacted aluminum hereinbefore described.

The product stream in the conduit 12 is continuously passed into a flash tank 14 in which the hydrogen partial pressure on the reaction product is lowered to approximately atmospheric pressure while maintaining the temperature of the dialkyl aluminum hydride in the flash tank at from about 70° F. to about 300° F. However, by utilizing a temperature in the flash tank in approximately the same range as that which is utilized in the multi-stage reaction vessel 10, little, if any, preheat is required to bring the process stream to the desired temperature for final conversion to the trialkyl aluminum product sought by contact with α-olefinic material in the second reaction process.

From the flash tank 12, the dialkyl aluminum hydride intermediate, saturated with hydrogen gas at the flash tank pressure, is next passed continuously into a second reaction zone 16 where it is contacted with α-olefinic material to yield a trialkyl aluminum product according to Reaction 2 as set forth above. Another way of expressing the reaction occurring in reaction vessel 16 is (3)
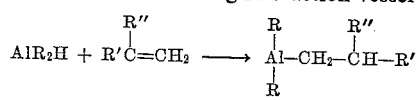

where R is as defined hereinbefore and R′ and R″ are selected from the class consisting of hydrogen and alkyl groups containing from 1 to 18 carbon atoms. The residence time of the reactants in the reaction zone 16 is from about 1 minute to about 25 minutes and the reaction temperature maintained therein is between about 200° F. and about 300° F.

It will be noted that, by selection of the α-olefinic materials introduced to the second reaction zone 16, the molecular character of the trialkyl aluminum compound which is produced may be varied. Either a single α-olefinic material or mixed α-olefins may be charged to the second reaction zone 16.

Examples of suitable α-olefinic compounds having the structural formula

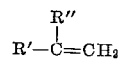

as defined above include, but are not limited to, ethylene, propylene, 1-butene, 1-pentene, 1-hexene, 1-heptene, 1-octene, 4-hexyl-1-nonene, 2-methyl-1-butene, 4,4-diethyl-1-decene, 1-eicosene, 1-tridecene, 1-hexadecene, and 3,4-dibutyl-1-octene.

The trialkyl aluminum product from the reaction zone 16 is passed through a conduit 18 to the primary flash tank 20 and secondary flash tank 22 to remove excess hydrogen and α-olefinic material therefrom. A portion of the trialkyl aluminum product may be recycled to the multi-stage reaction zone 10 via the conduit 24 and used to supply the necessary quantity of the trialkyl aluminum reactant used in the first reaction. The finely divided, highly activated aluminum which is carried by the effluent stream from the flash tanks 20 and 22 is separated from the trialkyl aluminum product and recycled to the slurry entering the multi-stage reaction zone 10 so that the benefits of enhanced metal activation and reduced reactant residence time hereinbefore described may be realized.

Having described the general reaction conditions and path of flow of reactants and products which are utilized in practicing the process of the present invention, the details of construction of one embodiment of the novel, multi-stage reaction zone 10 which is utilized for carrying out the hydrogenation reaction or the initial dialkyl aluminum hydride yielding reaction of the process will be described. Reference is made to FIGURE 2 of the drawings which is a sectional view taken through the center of a multi-stage reaction vessel which is a preferred and illustrative embodiment of the multi-stage reaction zone. In this illustrative embodiment of the invention, the reaction vessel comprises an elongated, generally cylindrical, vertical tank 12 which is closed at its upper and lower ends by closure plates 14 and 16, respectively. A series of vertically spaced, annular baffle plates 18 are spaced from each other along the length of the cylindrical tank 12 and are secured to the internal walls thereof. The diameter of the cylindrical tank 12 and the spacing of the annular baffle plates 18 is such that the diameter to height ratio of the vertically tiered reaction spaces or stages 20 which are delinated by the annular baffle plates is between 1:1 and 10:1. Although beneficial results are obtained from the provision of as few as two and as many as fifteen of the reaction stages 20, at least five of the stages are preferably employed and as many as twelve stages continue to substantially improve the efficiency of the reaction conducted in the reaction vessel 10.

Extending concentrically through the central apertures of the annular baffle plates 18 from one end of the cylindrical tank 12 to the other end thereof is an elongated shaft 22. Shaft 22 is rotatably journaled in the end plates 14 and 16 of the cylindrical tank 12. Spaced along the length of shaft 22 at intervals corresponding to the spacing of the annular baffle plates 18 are a plurality of disc-shaped baffles 24. The disc-shaped baffles 24, however, are secured to the shaft 22 at positions which are slightly offset in an axial direction from the annular baffle plates 18 and are of slightly lesser diameter than the apertures or openings through the annular baffle plates 18. There is thus provided a generally annular passageway between the disc baffles 24 and the annular baffles 18 and the relative positions of these baffle members and their diametric dimensions are such that a sufficient clearance is allowed to exist between them to permit aluminum particles of the largest size which it is contemplated will be used in the reactor to pass therethrough.

A series of radially extending paddles 26 are secured to the shaft 22 and are spaced along the length thereof. The paddles 26 are positioned on the shaft 22 so that a set of paddles symmetrically distributed circumferentially around the shaft 22 and extending radially therefrom in substantially a single plane will be located at approximately the midpoint between each pair of disc baffles 24. In other words, each of the reaction stages 20 contains a set of the radially extending paddles 26 which rotate with the shaft 22 to agitate the mixture of reactants and products within the respective reaction stage. To provide additional turbulence and mixing within each of the reaction stages 20, a plurality of elongated inwardly extending baffle member 28 are secured to the internal walls of the cylindrical tank 12 and extend throughout the length thereof. In a preferred embodiment of this aspect of the invention, three of the baffle members 28 are provided and are circumferentially spaced from each other at 120° around the internal periphery of the cylindrical tank 12.

In the operation of the multi-stage reaction vessel 10, the vessel is initially substantially completely filled with the slurry of metallic aluminum in the trialky aluminum compound and sovent which are to be used. Rotation of the coaxia shaft 22 preferably is commenced prior to completely filling to prevent settling of the aluminum particles. The product outlet conduit at the bottom of the reaction vessel 10 is kept closed until the vessel is filled with the slurry. Hydrogen is simultaneously introduced to the bottom of the reactor at the rate hereinbefore described. There is thus effected intimate contact of hydrogen with the trialkyl aluminum in the lowermost reaction stage 20 in the reaction vessel 10. After the reaction vessel 10 has been filled with the slurry, the outlet conduit at the bottom of the reaction vessel is opened and dialkyl aluminum hydride product is thereafter continuously removed from the reactor. As has been previously indicated, as an alternative to the introduction of the slurry to the top of the reaction vessel 10, such slurry may be introduced at the bottom of the reaction vessel in substantially the same manner as taught by the Zosel patent to which reference has hereinbefore been made.

The rate at which hydrogen and slurry material are introduced to the multi-stage reactor 10 can be varied through wide limits by virtue of the absence of any requirement for the development of gas barriers or pockets in order to prevent retrograde flow of any of the reactants in the reactor. The subdivided aluminum metal which enters the reactor is maintained in a suspended state in each of the reaction stages 20 and is intimately contacted with both the hydrogen gas and the trialkyl aluminum compound. The clearance between the annular baffles 18 and the disc-shaped baffles 24 assures that no obstruction is afforded to the free passage of aluminum particles from the end of the reactor in which they are introduced to the opposite end of the reactor, and in each instance, once the aluminum particles have entered a subsequent or adjacent stage 20 of the reaction vessel, they are maintained in suspension in that stage until the degree of conversion which is to be effected therein has been accomplished.

The following example will serve to better illustrate the operation of the multi-stage reaction zone 10 to achieve a high degree of conversion of the described reactants to the diethyl aluminum hydride product which is an intermediate in the synthesis of trialkyl aluminum compounds.

A solution of triethyl aluminum in kerosene (boiling range 360 to 500° F.) having a triethyl aluminum concentration of 42 weight percent and containing 7 weight percent aluminum powder is continuously pumped into the top of a multi-stage reaction zone containing twelve stages defined by baffle plates of the type hereinbefore described. Each stage of the reaction zone contains six radially extending paddles which are equi-angularly circumferentially spaced around a coaxial shaft which is rotatably mounted in the reaction zone. The aluminum powder which is slurried into the solution of triethyl aluminum in kerosene prior to introducing the slurry to the zone preferably has a particle size of from about 0.001 inch to about 0.125 inch. The aluminum metal contains a small amount of a zirconium metal activator which is introduced during the preparation of the finely divided aluminum. The slurry is pumped into the multistage reaction zone at a space velocity of 0.4 gallon per hour per gallon of reaction vessel capacity. Temperature of the reaction zone is adjusted to about 270° F. prior to the commencement of the reaction therein.

Hydrogen is introduced to the bottom of the reaction zone at a partial pressure, which is sufficient to saturate the liquid solution in the reaction zone and to provide the necessary hydrogen for the reaction, when operating with a reaction zone having a capacity or volume of 1000 gallons.

From the bottom of the reaction zone, a product stream containing approximately 83 percent by weight of diethyl aluminum hydride based on the total alkyl aluminum compounds therein, is continuously removed from the reaction zone.

From the foregoing description of the invention, it will be apparent that the present invention provides a novel means for improving the process by which dialkyl aluminum hydride may be manufactured and consequently for improving the overall process hereinbefore described for production of trialkyl aluminum. Although certain features have been discussed hereinbefore by way of example, the details of the apparatus and process which have been prescribed in the foregoing specification are not intended to be limiting, or to restrict the scope of the present invention, except as such restriction may be required by the language and construction of the appended claims. In other words, insofar as innovations and apparatus structural details hereinbefore enumerated continue to rely upon the principles underlying the invention, such modifications and innovations are deemed to be encompassed within the spirit and scope of the invention.

I claim:

1. In a process for preparing dialkyl aluminum hydride by the reaction of trialkyl aluminum, aluminum, and hydrogen at an elevated temperature and pressure, the improvement which comprises:
   (a) introducing to the upper end of a vertical, multistage reaction zone having a plurality of vertically-tiered reaction spaces therein separated by baffle means and containing mechanical agitation means, said reaction zone being capable of handling aluminum particles as large as 0.125 inch, a slurry of finely divided metallic aluminum, having a particle size between about 3 microns and about 0.125 inch, in a liquid trialkyl aluminum compound in which the alkyl substituents of the trialkyl aluminum contain from 2 to 20 carbon atoms;
   (b) introducing to the lower end of said reaction zone, from about 0.45 to about 5 moles of hydrogen gas per mole of said trialkyl aluminum compound;
   (c) thoroughly mechanically agitating the slurry-gaseous mixture in each of said reaction spaces while maintaining the temperature in said multistage reaction zone in the range of from about 200° F. to about 350° F., and the pressure therein from about 200 p.s.i.g. to about 5000 p.s.i.g.; and
   (d) removing the dialkyl aluminum hydride reaction product from the same end of said multistage reaction zone wherein said hydrogen gas is introduced and opposite that end to which said slurry is introduced.

2. The method claimed in claim 1 wherein said finely divided aluminum has a particle size between 0.001 inch and 0.125 inch.

3. A method as claimed in claim 1 wherein said metallic aluminum and said trialkyl aluminum compound are introduced to said multi-stage reaction zone in a mole ratio of about 1 mole of aluminum metal to about 1 mole of trialkyl aluminum compound.

4. The method claimed in claim 3 wherein the reaction in said multi-stage reaction vessel is carried out at a hydrogen partial pressure of between 500 p.s.i.g. and 2500 p.s.i.g. and a temperature of from 230° F. to 290° F.

References Cited

UNITED STATES PATENTS

| | | | |
|---|---|---|---|
| 2,192,124 | 2/1940 | Brill et al. | 23—1 |
| 2,908,562 | 10/1959 | Dobratz | 260—448 X |
| 2,930,808 | 3/1960 | Zosel | 260—448 |
| 3,104,252 | 7/1963 | Radd et al. | 260—448 |
| 3,207,770 | 7/1965 | Ziegler et al. | 260—448 |
| 2,835,689 | 5/1958 | Ziegler et al. | 260—448 |
| 2,930,808 | 3/1960 | Zosel | 260—448 |
| 2,747,973 | 5/1956 | Hinrichs | 23—283 |
| 2,939,771 | 6/1960 | McDonald et al. | 23—283 |

OTHER REFERENCES

Perry's, Chemical Engineers' Handbook, McGraw-Hill Book Co., Inc. 2nd ed., 1941, page 1195.

TOBIAS E. LEVOW, *Primary Examiner.*

H. M. S. SNEED, *Assistant Examiner.*